Oct. 7, 1930.   L. BREGUET   1,777,347
SHOCK ABSORBING HUB
Filed Dec. 4, 1923   3 Sheets-Sheet 3

Inventor:-
Louis Breguet
By Mauro, Cameron, Lewis & Kerkam
Attorneys

Patented Oct. 7, 1930

1,777,347

UNITED STATES PATENT OFFICE

LOUIS BREGUET, OF PARIS, FRANCE, ASSIGNOR TO SOCIÉTÉ ANONYME DES ATELIERS D'AVIATION LOUIS BREGUET, OF PARIS, FRANCE

SHOCK-ABSORBING HUB

Application filed December 4, 1923, Serial No. 678,510, and in France December 6, 1922.

In most of the systems of landing gear as used at present, the elastic shock-deadening device is placed outside the wheel between the hub and the frame of the landing gear.

The present invention relates to a wheel arrangement with elastic spring suspension, the main feature of which consists in the arrangement of the shock absorber inside the hub of the wheel, which affords certain advantages hereinafter to be pointed out. The deadening device is preferably constituted by sandows.

The invention will be readily understood by reference to the accompanying drawings, wherein like reference characters refer to like parts throughout the several views and wherein, Fig. 1 is a cross section of a wheel in which the shock absorbing device is placed within the hub, taken along the line 1—1 of Fig. 2;

Fig. 4 is a detail view of the cylindrical bearing forming the hub of the wheel and acting as a slide for the axle carried by the uprights of the landing gear and taken along the line 4—4 of Fig. 1;

Fig. 7 is a section taken along the line 7—7 of Fig. 6.

The wheel comprises a rim $a$ on which is mounted the usual pneumatic tire, which rim is secured by means of spokes $b$ to a sleeve $c$ forming a pseudo-hub for absorbing the transverse reactions. The said sleeve $c$ is rigidly connected, through intermediate members D and bolts $d$, with demountable annular flange members $f$ adapted to rotate about a fixed cylindrical cage bearing $g$—$h$ along the bearing surfaces $g'$ thereof.

Figure 1:
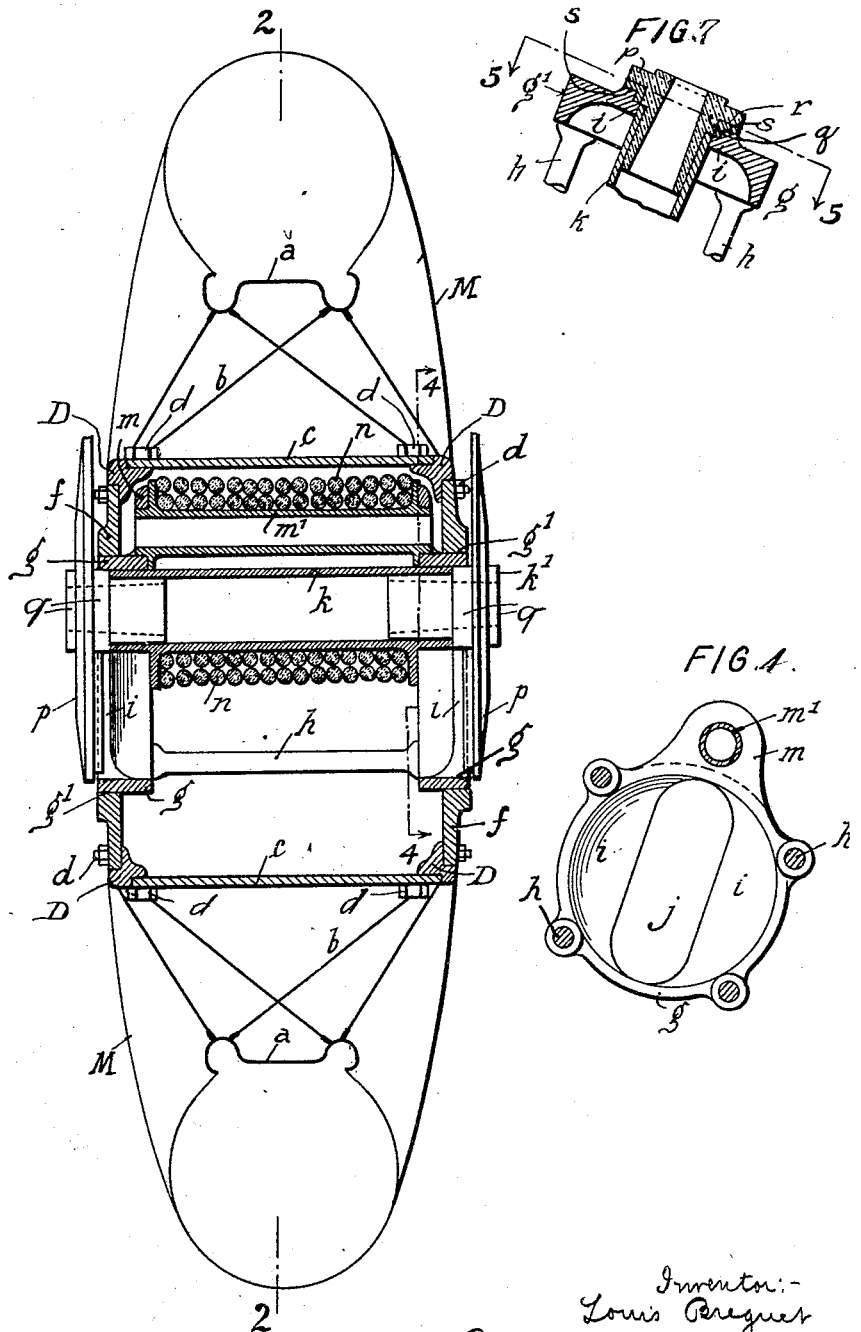
Figure 2:
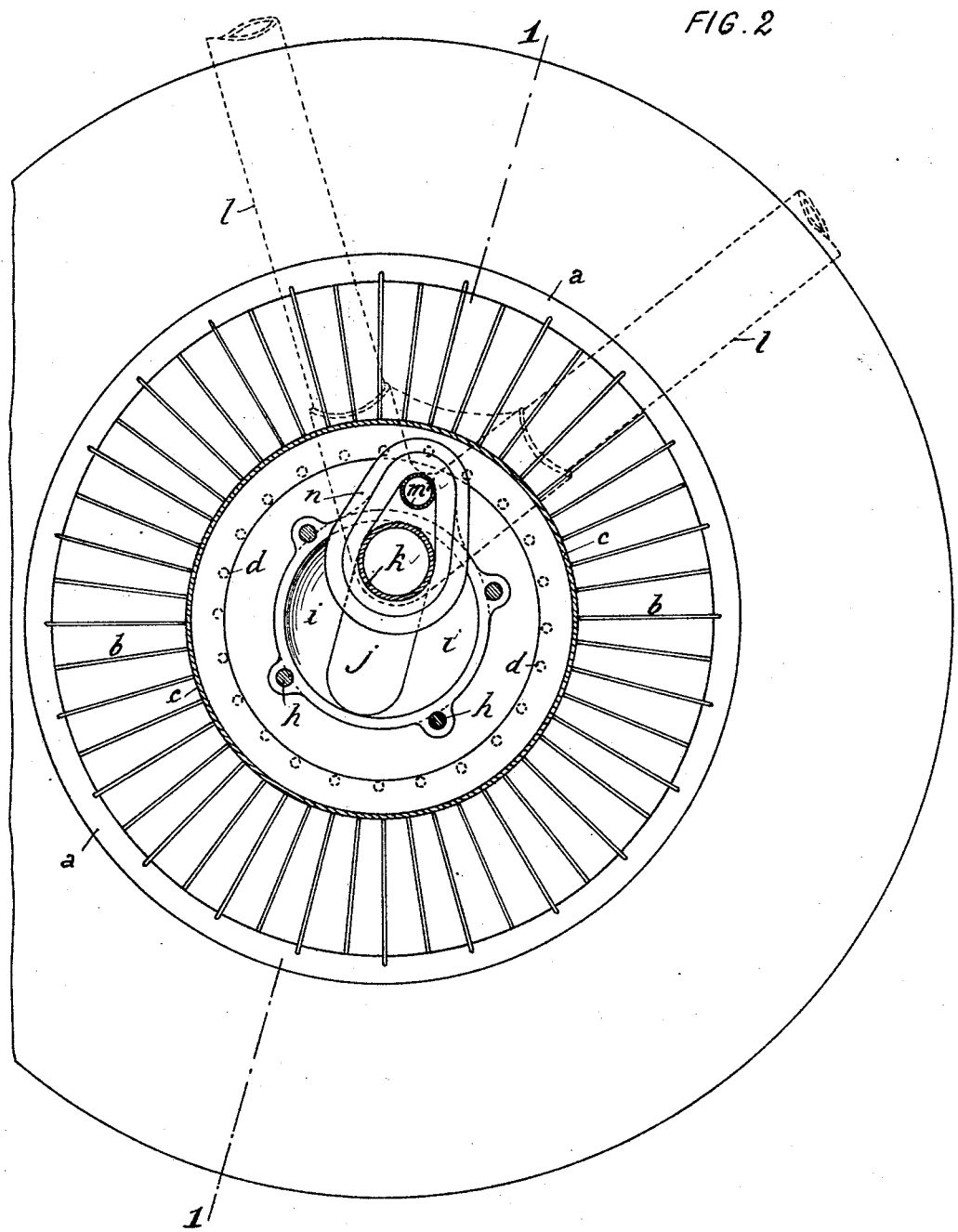
Fig. 2 is a longitudinal section taken along line 2—2 of Fig. 1, illustrating the relative position of the parts during flight.
Figures 3, 5, 6:
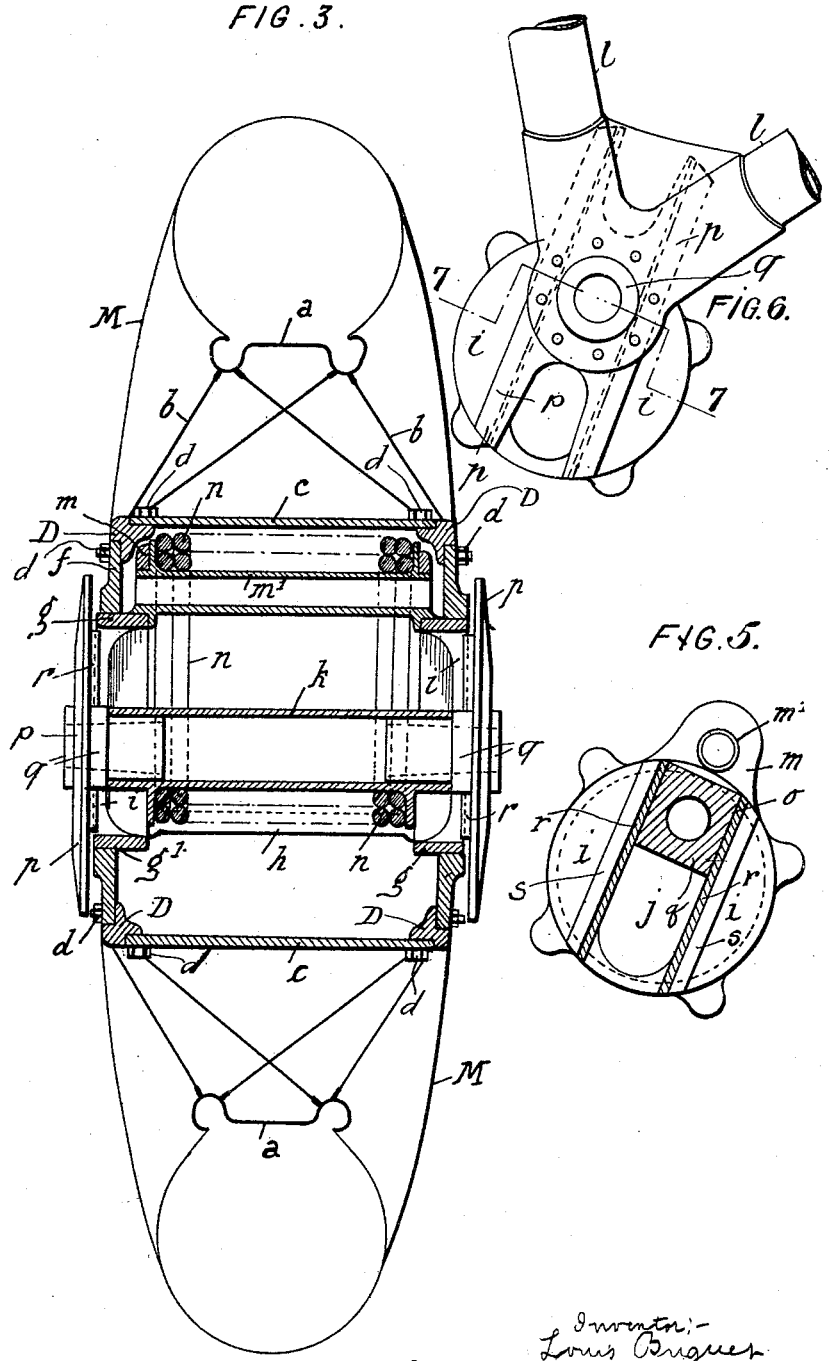
Fig. 3 is a view corresponding to Fig. 1, illustrating the relative position of the parts at the moment of landing.
Fig. 5 is a view of the cylindrical bearing with the axle in position in the slot thereof taken along the line 5—5 of Fig. 7.
Fig. 6 is an external view showing the bifurcated flange member $p$.

Said bearing is constituted, as shown in Fig. 1, by two rings $g$ connected and braced by bolts $h$ secured to the rings in any known or other suitable manner, the whole constituting a sort of squirrel cage $g$—$h$ and provided at the opposite ends with the two bearing rings and two cheeks $i$ which can be seen in Figs. 4 and 5. Said cheeks $i$ are each provided with a slot $j$ in which is slidably mounted a tube $k$ secured to the uprights $l$ of the landing gear as best shown in Figs. 2 and 6. Moreover, the bearing is provided with two ears or lugs $m$ each cast in one piece with a ring $g$ thereof between which is rigidly secured a tube $m^1$. Tube $m^1$ is thus fixed while the tube $k$ can slide without rotating in the slots $j$ of the cheeks $i$.

Around the two tubes $m^1$ and $k$ are provided sandows $n$, as shown in section in Fig. 1 and in side elevation in Figs. 2 and 3, the said sandows normally maintaining the said tubes in close proximity to each other. During flight the parts occupy the position shown in Figs. 1 and 2. At the moment of landing, the wheel comes into contact with the ground on which it rolls, freely rotating about the bearing. The body of the airplane connected rigidly with the shaft $k$ through the uprights $l$ of the landing gear causes, under the action of its own weight, the tube to be downwardly displaced with reference to the wheel, the said tube sliding in the slots $j$ of the cheeks $i$. The tube $k$ in moving away from the tube $m^1$ stretches the sandows $n$, as shown best in Fig. 3, thereby deadening the landing shocks.

For properly guiding the shaft $k$ in the slots $j$ and preventing the said drum from revolving any suitable known expedient may be employed. Likewise the tube $k$ can be connected with the uprights $l$ through any suitable device known to the art.

The arrangement here used for guiding the shaft $k$ and preventing turning movement between it and the cage is shown in detail in Figs. 5 to 7. Each end of the tubular shaft $k$ is provided with a squared end member $q$ carrying the bifurcated flange extensions $p$. The sides of the member $q$ and the flange extensions slide on bushings $r$ of L-shaped cross-section interposed between them and a pair of guide ribs $s$ on the outer face of the cheek $i$.

The ribs s with their bushings thus form a guide for the shaft and a cheek bearing on the outside of the cheek to take the side thrust.

The advantages of such a system of shock absorber for landing gear are, first, reduction in bulkiness and weight since the space is much reduced and consequently the parts which are subject to flexion or bending strains are very short and, as a result correspondingly light; second, considerable reduction of the resistance to progress, this resistance being reduced to that which the wheel offers; third facility of landing on bad grounds such as unmown fields, as there are no parts projecting outside the wheel; fourth, very easy and very light careening reduced to that of the wheel by the use and disposition of members $p$; fifth, lightening of the shaft $k$ which is very short and which can then be used as a member forming part of the landing device and joined to the V-shaped uprights of the landing gear and consequently capable of supporting the strains and stresses imparted thereto during flight, whereas in the landing devices known in the art the shaft operates only during landing and thereby necessitates the provision of other parts for sustaining the above mentioned strains and stresses; sixth, the inertia of the whole arrangement is considerably reduced due to the reduction in size of movable parts which as a result produces a more rapid damping out of the oscillations produced therein; and seventh, facility of mounting, demounting and replacing the sandows.

While I have disclosed what I deem to be the preferable form of my device I do not wish to be limited thereto as there might be various changes made in the details of construction without departing from the spirit of the invention comprehended within the scope of the appended claims. It is to be understood that while sandows have been disclosed any other equivalent endless flexible expedients might readily be adopted. Furthermore the invention has been disclosed, by way of example, in connection with the landing struts of an aeroplane, but it is to be understood that the device is readily applicable to any other type of vehicle where its use would be fit to replace the usual springs thereof.

Having thus described my invention, what I claim as new and desire to secure by Letters Patent is—

1. In a pseudo-hub of the type described a spoke carrying sleeve, a demountable annular flange rigidly secured at each end of said sleeve, a bearing ring for each of said flanges loosely mounted therein, a lug carried by each of said bearing rings extending radially beyond the outer cylindrical bearing surfaces of said rings, a tube secured between said lugs, a cheek carried by each of said bearing rings, each provided with an elongated slot, a cheek bearing member on the outer side of each cheek, a fixed supporting shaft slidably mounted in said slots, flange extensions on each end of said shaft engaging the said cheek bearings adjacent thereto and a plurality of endless flexible elements surrounding said tube and said supporting shaft for the purpose set forth.

2. In a pseudo-hub of the type described a spoke carrying sleeve, a demountable annular flange rigidly secured at each end of said sleeve, a bearing ring for each of said flanges loosely mounted therein, a lug carried by each of said bearing rings extending radially beyond the outer cylindrical bearing surfaces of said rings, a shaft supporting tube secured between said lugs, a cheek carried by each of said bearing rings, each provided with an elongated slot, a plurality of bracing bolts interconnecting said bearing rings, a pair of guide ribs carried on the outer face of each cheek, a fixed supporting shaft slidably mounted in said slots, flange extensions on each end of said supporting shaft bearing against said ribs adjacent thereto and a plurality of endless flexible elements surrounding said shaft supporting tube and said supporting shaft for the purpose set forth.

3. In a pseudo-hub of the type described a spoke carrying sleeve, a demountable annular flange rigidly secured at each end of of said sleeve, a bearing ring for each of said flanges loosely mounted therein, a lug carried by each of said bearing rings extending radially beyond the outer cylindrical bearing surfaces of said rings, a shaft supporting tube secured between said lugs, a cheek carried by each of said bearing rings, each provided with an elongated slot, a pair of guide ribs carried on the outer face of each cheek, a fixed supporting shaft slidably mounted in said slots, a plurality of bracing bolts interconnecting said bearing rings and forming therewith a rigid cage structure, a flange on each end of said supporting shaft adjacent thereto and a plurality of superposed sandows surrounding said supporting shaft and said tube for the purpose set forth.

4. In a pseudo-hub of the type described, a spoke carrying sleeve, a demountable annular flange rigidly secured at each end of said sleeve, having an inside cylindrical bearing surface, a bearing ring for each of said flanges having an outside cylindrical bearing surface in bearing engagement with the inside bearing surface of the flange, bracing bolts joining said rings in spaced relation to form a rigid cage structure, a lug carried by each bearing ring extending radially thereof outside the cage structure, a sandow supporting tube secured to said lugs axially across the cage structure and positioned radially beyond the cage structure, a fixed supporting shaft extending through said cage structure axially thereof and a plurality of sandows passed around said shaft within the cage and through the side of the cage around said supporting tube.

5. In a pseudo-hub of the type described, a spoke carrying sleeve, a demountable annular flange rigidly secured at each end of said sleeve, having an inside cylindrical bearing surface, a bearing ring for each of said flanges having an outside cylindrical bearing surface in bearing engagement with the inside bearing surface of the flange, bracing bolts joining said rings in spaced relation to form a rigid cage structure, a lug carried by each bearing ring extending radially thereof outside the cage structure, a sandow supporting tube secured to said lugs axially across the cage structure and positioned radially beyond the cage structure, cheeks carried by each of said bearing rings each provided with an elongated slot, a fixed supporting shaft extending through the cage structure by way of the slots in the cheeks, a plurality of sandows supporting said shaft on said tube, a pair of guide ribs carried on the outer face of each cheek, a squared end member carried on each end of the supporting shaft, and a flange extension carried on each squared end member, said flange extensions and the sides of said end members being arranged to slide upon said guide ribs.

In testimony whereof I have signed this specification.

LOUIS BREGUET.